J. SIMPSON.
Reversing-Link for Steam-Engines.
No. 160,358.                                         Patented March 2, 1875.
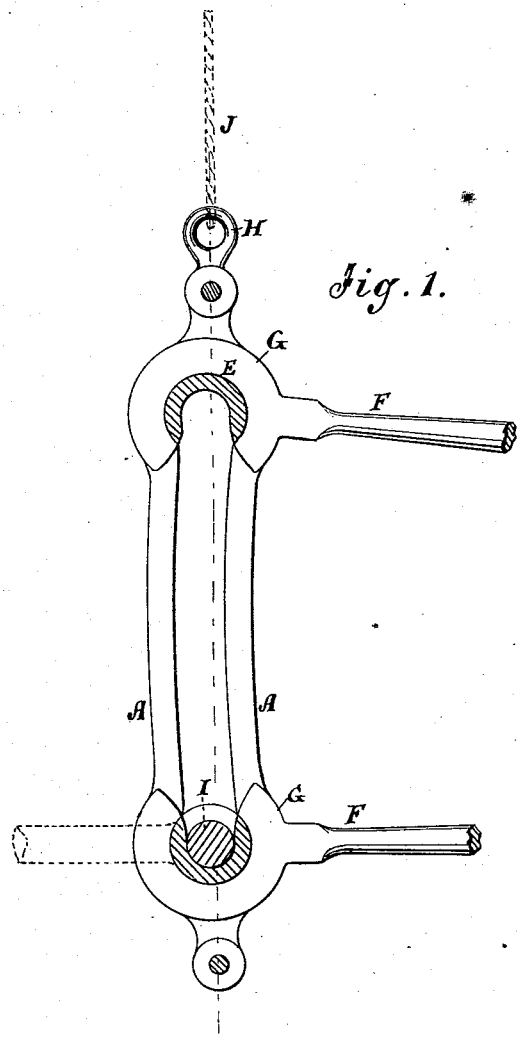
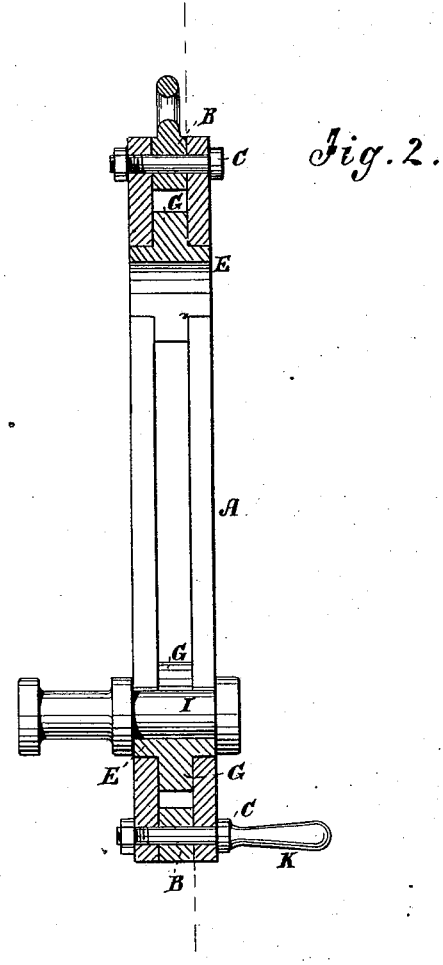
WITNESSES:
INVENTOR:
J. Simpson
BY Munn & Co
ATTORNEYS.

UNITED STATES PATENT OFFICE.

JOHN SIMPSON, OF MEADVILLE, PENNSYLVANIA, ASSIGNOR TO DICK & CHURCH, OF SAME PLACE.

IMPROVEMENT IN REVERSING-LINKS FOR STEAM-ENGINES.

Specification forming part of Letters Patent No. 160,358, dated March 2, 1875; application filed June 20, 1874.

*To all whom it may concern:*

Be it known that I, JOHN SIMPSON, of Meadville, Crawford county, Pennsylvania, have invented a new and Improved Reversing-Link for Steam-Engines, of which the following is a specification:

The invention relates generally to valve-gearing, but particularly to that shown in the patent No. 125,769.

The invention will first be fully described, and then pointed out in the claim.

Figure 1 is a sectional elevation of my improved reversing-link, taken on the line $x\,x$, Fig. 2; and Fig. 2 is a sectional elevation, taken on the line $y\,y$, Fig. 1.

A represents the two slotted links, having a large circular recess at each end of the slot, and bolted to a block, B, and also together at each end, by a bolt, C. E represents the notched pivots of the eccentric rods F, one of which is fitted in each end of the link, and G represents the collar in the middle of each pivot, fitted between the two plates to hold the pivots in place, making a simple and cheap contrivance, well adapted for durability. I is the wrist-pin of the valve-rod, which works in the notched pivots. One of the blocks B, to which the plates are fastened, composes the eye H, by which the link is suspended with a cord or chain, J, and one of the bolts constitutes a handle, K, for shifting the link by hand.

Having thus described my invention, I claim as new and desire to secure by Letters Patent—

The combination - links A, having slots, bolted to a block, B, and made circular at each end, in combination with the eccentric rods F, having notched pivots E, and the collar G, as and for the purpose specified.

JOHN SIMPSON.

Witnesses:
W. C. LATIMER,
HENRY CHURCH.